(12) United States Patent
Pignataro et al.

(10) Patent No.: US 12,556,422 B2
(45) Date of Patent: Feb. 17, 2026

(54) SUSTAINABILITY-AWARE VIRTUAL MEETINGS

(71) Applicant: Cisco Technology, Inc., San Jose, CA (US)

(72) Inventors: Carlos Pignataro, Cary, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 18/335,841

(22) Filed: Jun. 15, 2023

(65) Prior Publication Data

US 2024/0422018 A1    Dec. 19, 2024

(51) Int. Cl.
*G06F 15/16* (2006.01)
*H04L 12/18* (2006.01)
*H04L 41/0803* (2022.01)

(52) U.S. Cl.
CPC ...... *H04L 12/1822* (2013.01); *H04L 41/0803* (2013.01)

(58) Field of Classification Search
CPC .............. H04L 12/1822; H04L 41/0803
USPC .......................................... 709/204
See application file for complete search history.

(56) References Cited

U.S. PATENT DOCUMENTS

| | | | | |
|---|---|---|---|---|
| 8,358,298 B2 * | 1/2013 | Lee | ........................ | G06F 1/3203 |
| | | | | 713/340 |
| 11,849,258 B2 * | 12/2023 | Doken | ..................... | H04N 7/15 |
| 2011/0080422 A1 | 4/2011 | Lee et al. | | |
| 2012/0330478 A1 * | 12/2012 | Malsch | .............. | G05B 19/4185 |
| | | | | 700/297 |

(Continued)

FOREIGN PATENT DOCUMENTS

| | | |
|---|---|---|
| CN | 108111315 A | 6/2018 |
| JP | 2016010118 A | 1/2016 |
| WO | WO-2023191903 A1 * | 10/2023 ........... H04L 45/745 |

OTHER PUBLICATIONS

International Search Report and Written Opinion for International Application No. PCT/US2024/033665, mailed Sep. 13, 2024, 13 Pages.

*Primary Examiner* — Alicia Baturay
(74) *Attorney, Agent, or Firm* — Rutan & Tucker, LLP; Ravi Mohan; Marc McClain

(57) ABSTRACT

Devices, systems, methods, and processes for conducting sustainability-aware virtual meetings are described herein. When establishing virtual meetings, each of the participants can have various devices, locations, histories, and other data associated with them. This data can be packaged together as a user profile which can be transmitted to a virtual meeting service or a host that can receive the various user profiles and generate a meeting profile that can be utilized to maximize the overall sustainability of the virtual meeting. The meeting profile can include configuration suggestions that can be transmitted out to each corresponding device of (Continued)

the participants to either prompt or automatically adjust one or more settings, features, or other configuration, such as energy-saving features, that can increase the overall sustainability. These conditions can be monitored during the meeting and adjusted dynamically in response to changing conditions. In response, devices can adjust configurations or alter audio/video transmissions.

20 Claims, 10 Drawing Sheets

(56) References Cited

U.S. PATENT DOCUMENTS

| | | | |
|---|---|---|---|
| 2015/0169352 A1* | 6/2015 | Shi | H04L 67/34 |
| | | | 718/1 |
| 2016/0210702 A1* | 7/2016 | Nakazawa | G06Q 40/12 |
| 2016/0234268 A1 | 8/2016 | Ouyang et al. | |
| 2016/0277456 A1 | 9/2016 | Sallam | |
| 2018/0321724 A1 | 11/2018 | Subramanian et al. | |
| 2023/0179742 A1 | 6/2023 | Doken | |
| 2024/0020157 A1* | 1/2024 | Gill | G06N 20/00 |
| 2024/0089852 A1* | 3/2024 | Yang | H04W 24/02 |
| 2025/0023822 A1* | 1/2025 | Dong | H04L 45/745 |

\* cited by examiner

SUSTAINABILITY-AWARE VIRTUAL MEETINGS

The present disclosure relates to online virtual meetings. More particularly, the present disclosure relates to utilizing user profile data to generate configurations for the devices utilized during the virtual meeting.

BACKGROUND

Virtual meetings have become increasingly popular in recent years, especially since the COVID-19 pandemic made remote work and social distancing the norm. Virtual meetings can refer to any type of meeting that takes place over the internet, using video conferencing software or other tools. These tools can be operated on personal computing devices and even mobile computing devices such as smartphones, tablets, etc.

Virtual meetings have many advantages. For example, people can collaborate from anywhere in the world, which is especially helpful for teams that are distributed across different locations. Virtual meetings also save time and money by eliminating the need for travel, as well as reducing the need for physical office space. In addition, virtual meetings can be recorded, which can be useful for reviewing discussions and decisions later on.

During a virtual meeting, participants generate and transmit various types of data. This includes audio data, such as speech and background noise captured by microphones, and video data, such as images of participants and their surroundings captured by cameras. Text data, including chat messages and typed messages, is also generated, and transmitted between participants. Additionally, screen sharing data, which includes content shared from one participant's screen to others, and metadata, such as the date and time of the meeting and participant information, are also transmitted.

The video data that is transmitted during a virtual meeting includes images of the participants and their surroundings, as captured by the cameras on their devices. This data can include live video of participants speaking or listening, as well as any movements or gestures they make during the meeting. The video data may constitute a large portion of the data transmitted during a virtual meeting. As a result, many resources may be utilized to facilitate the transmission of this data. These resources can include the use of electricity generated from a variety of non-sustainable power sources.

SUMMARY OF THE DISCLOSURE

Systems and methods for utilizing user profile data to generate configurations for the devices utilized during the virtual meeting in accordance with embodiments of the disclosure are described herein. In some embodiments, a device, comprises a processor, a memory communicatively coupled to the processor, a communication port coupled with a second device, and a virtual meeting logic. The virtual meeting logic is configured to establish a virtual meeting with a plurality of participants, receive user profile data, and generate one or more suggestions for each of the plurality of participants. The virtual meeting logic is further configured to transmit the one or more suggestions to the plurality of participants and conduct the virtual meeting.

In some embodiments, the virtual meeting logic is further configured to generate meeting profile data based on at least the received user profile data.

In some embodiments, the generation of the one or more suggestions is based on the meeting profile data.

In some embodiments, the virtual meeting logic is further configured to adjust at least one virtual meeting configuration based on the meeting profile data.

In some embodiments, the virtual meeting logic is further configured to request user profile data from each participant prior to receiving user profile data.

In some embodiments, each of the plurality of participants has a corresponding device associated with the virtual meeting.

In some embodiments, the virtual meeting logic is further configured to collect sustainability data.

In some embodiments, the virtual meeting logic is further configured to determine one or more configuration options for each of the corresponding devices associated with the virtual meeting.

In some embodiments, the virtual meeting logic is further configured to generate a suggested configuration for each of the corresponding devices associated with the virtual meeting wherein the suggested configuration is based on the collected sustainability data and determined one or more configuration options.

In some embodiments, the suggested configurations are transmitted to each of the corresponding devices associated with the virtual meeting.

In some embodiments, the virtual meeting logic is further configured to verify that the suggested configurations have been adopted by the corresponding devices associated with the virtual meeting.

In some embodiments, the virtual meeting logic is further configured to monitor one or more conditions associated with the virtual meeting.

In some embodiments, the virtual meeting logic if further configured to determine of the one or more conditions are suitable for a change in configuration.

In some embodiments, the virtual meeting logic is further configured to change at least one configuration during the virtual meeting based on the one or more conditions being suitable for a change in configuration.

In some embodiments, a device, comprises a processor, a memory communicatively coupled to the processor, a communication port coupled with a second device, and a virtual meeting logic. The virtual meeting logic is configured to receive a request for user profile data, collect current environmental conditions, and generate user profile data based on the collected environmental conditions. The virtual meeting logic can also be configured to transmit the user profile data, and conduct the virtual meeting.

In some embodiments, the virtual meeting logic is further configured to receive one or more suggested configurations associated with the virtual meeting.

In some embodiments, one or more of the suggested configurations are implemented during the virtual meeting.

In some embodiments, a method of conducting a virtual meeting, comprises establishing a virtual meeting with a plurality of participants, receiving user profile data, and generating one or more suggestions for each of the plurality of participants. The method can further comprise transmitting the one or more suggestions to the plurality of participants, and conducting the virtual meeting.

In some embodiments, the method further includes requesting user profile data prior to receiving the user profile data, and generating meeting profile data based on at least the received user profile data.

In some embodiments, the method further includes utilizing the meeting profile data to generate one or more virtual meeting configuration suggestions for each of the plurality of participants and their associated devices.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein.

Figure 1:
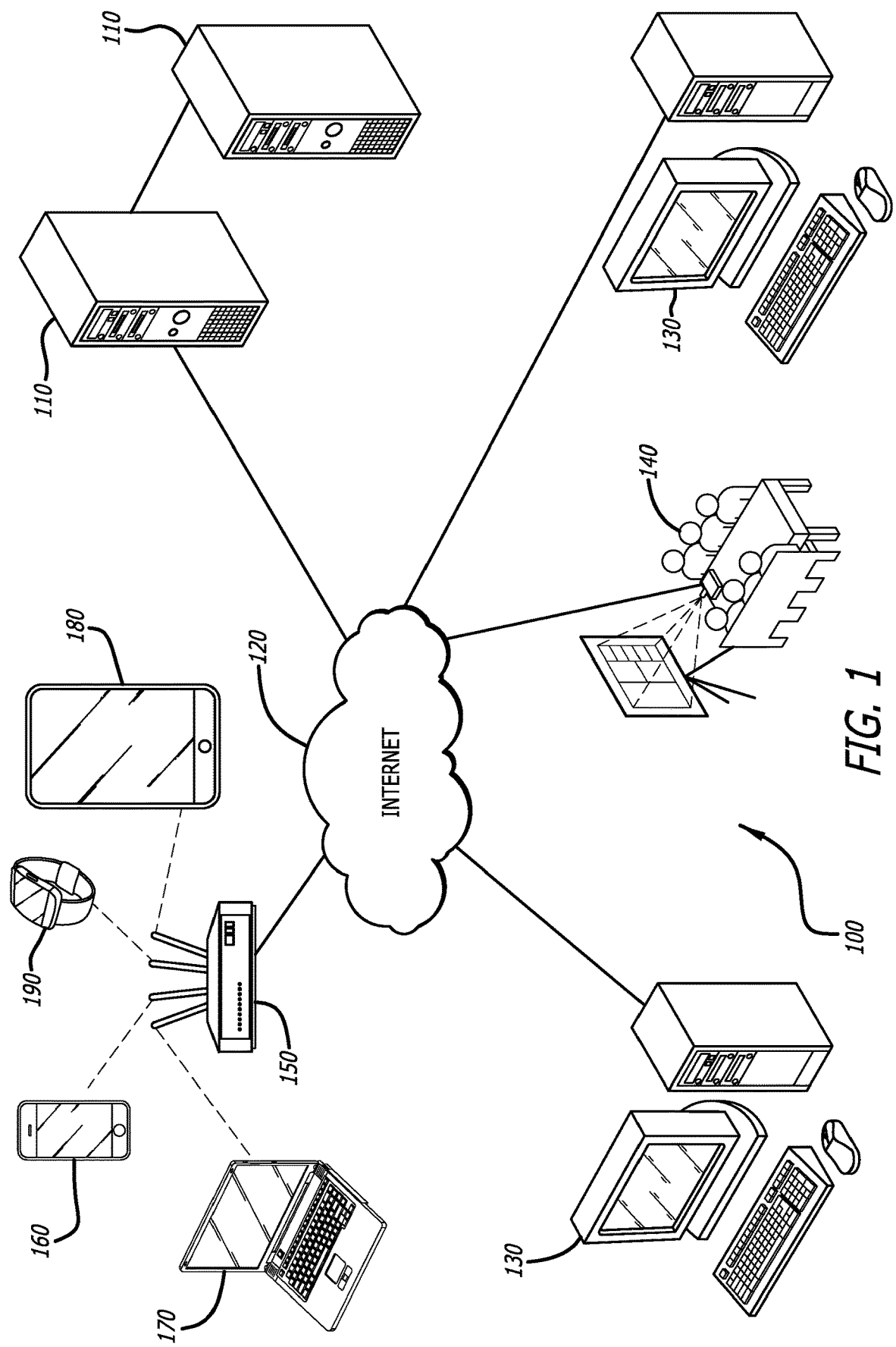
FIG. 1 is a conceptual illustration of a network with network devices powered suitable for dynamic video reduced size video transmission data rate collaborations in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that allow for conducting sustainability-aware virtual meetings over the network. Typically, virtual meeting solutions allow participants to connect from different types of endpoints which each appear as an atomic type. As more features are being added to these virtual meeting solutions, the amount of energy required to operate any related client software and administrative tasks increases. Over time, managing these features in a sustainable way has become more difficult.

For example, participants in virtual meetings can connect from different types of endpoints (e.g., fixed vs. battery powered; browsers to huge screens; different energy source types, etc.). However, traditional methods treat each of these locations and/or types similarly. Therefore, in various embodiments described herein, systems and methods can create an endpoint representation comprised of several types of modules that can be represented with user profiles. The user profiles can comprise identifying data related to the endpoint type, such as the physical components, power ratings, virtual or binary-like energy consuming features, codec choices, refresh speed, etc.

In a number of embodiments, a user profile is computed on a per-device basis from where the user can potentially join a virtual meeting. In more embodiments, a meeting profile is computed for each meeting hosted. The combination of user and meeting profiles can be utilized to identify critical and/or optional services that can be enabled and disabled for the virtual meeting. Additional device and feature suggestions can be negotiated with the participants. Sustainability-related features, codecs, etc. can be selected on the device from where the participant joins the meeting.

In this way, various services or quality levels can be adjusted based on user profiles (SD vs. HD, encrypted or not, audio vs. video, etc.). The available resources and capabilities on each device can be understood and utilized as needed to reduce energy consumption (thereby increasing the overall sustainability of the virtual meeting). The meeting profile can be associated, created, or provided by the participant hosting the meeting. The meeting profile can include multiple categories or heuristics to apply to different types of user profiles.

In additional embodiments, the user may be prompted to join a virtual meeting in an energy-efficient manner. In some embodiments, the meeting can be audio only, prompting the user to join via their smart phone instead of a desktop, etc. These prompts can be determined and generated from the virtual hosting software and be in response to upcoming meetings, etc. which can poll user devices and compare received data against the historical usage of each user. As changes occur during the meeting, which may result in the system changing settings and provide feedback to users if needed. However, in certain embodiments, the system may automatically change one or more settings to be more energy efficient.

In additional embodiments, the virtual meetings may also examine and configure the source of electricity that is powering the devices within the network that is conducting the virtual meeting. By utilizing these methods, a virtual meeting can be conducted that can require less electricity to conduct, either by transferring less data and/or by selecting video transmission settings based on the power sources available to the network.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual illustration of a network 100 with network devices powered suitable for sustainability-aware virtual meetings in accordance with various embodiments of the disclosure is shown. In many embodiments, the network 100 may comprise a plurality of devices that are configured to transmit and receive data related to providing, recording, and processing virtual meetings (i.e., online collaborations). In various embodiments, virtual meeting service servers 110 are connected to a wide-area network such as, for example, the Internet 120. In further embodiments, virtual meeting service servers 110 can be configured to transmit a variety of data across the Internet 120 to any number of computing devices such as, but not limited to, personal computers 130, virtual presentation devices 140, and mobile computing devices including laptop computers 170, cellular phones 160, portable tablet computers 180 and wearable computing devices 190. In additional embodiments, virtual meeting data may be mirrored or otherwise supplemented in additional cloud-based service provider servers or edge network systems. In still additional embodiments, the virtual meeting service servers 110 can be hosted as virtual servers within a cloud-based service.

In further embodiments, the sending and receiving of virtual meeting data can occur over the Internet 120 through wired and/or wireless connections. In the embodiment depicted in FIG. 1, the mobile computing devices are connected wirelessly to the Internet 120 via a wireless network access point 150. It should be understood by those skilled in the art that the types of wired and/or wireless connections between devices on the network 100 can be comprised of any combination of devices and connections as needed.

In various embodiments, the network 100 may broadly accept virtual meeting data, such as, but not limited to audio and video data from users via personal computers 130, virtual presentation devices 140, and/or mobile computing devices. These embodiments may, based on one or more thresholds or other network conditions/configurations, that video data may need to be transmitted to very other device within a virtual meeting. This may require determining the quantity of video transmissions within the virtual meeting. In more embodiments, the video being transmitted within the video data can utilize a reduced size video transmission data rate to transmit video frames at a lower rate than the standard frame rate, thereby reducing the amount of data that needs to be transmitted and processed over the Internet 120.

As discussed in more detail below, virtual meetings can be established that have a certain configuration. Based upon this configuration, various sustainability attributes data can be collected. Various features and/or configurations can be selected that increase the overall sustainability of the virtual meeting. These changes can be monitored throughout the meeting. Based on these changes during a virtual meeting, the configurations can change either automatically or in response to a participant being prompted to change one or more configurations or settings.

Although a specific embodiment for a network 100 suitable for utilizing a reduced size video transmission data rate within a virtual meeting is described above with respect to FIG. 1, any of a variety of systems and/or processes may be utilized in accordance with embodiments of the disclosure. For example, the virtual meeting service servers 110 may be configured to receive data and transfer it to another device within the network 100. In this way, it may be configured as a relay of the data. However, in some embodiments, the selection of data rate can be done on one or more user devices. The elements depicted in FIG. 1 may also be interchangeable with other elements of FIGS. 2-10 as required to realize a particularly desired embodiment.

Figure 2:
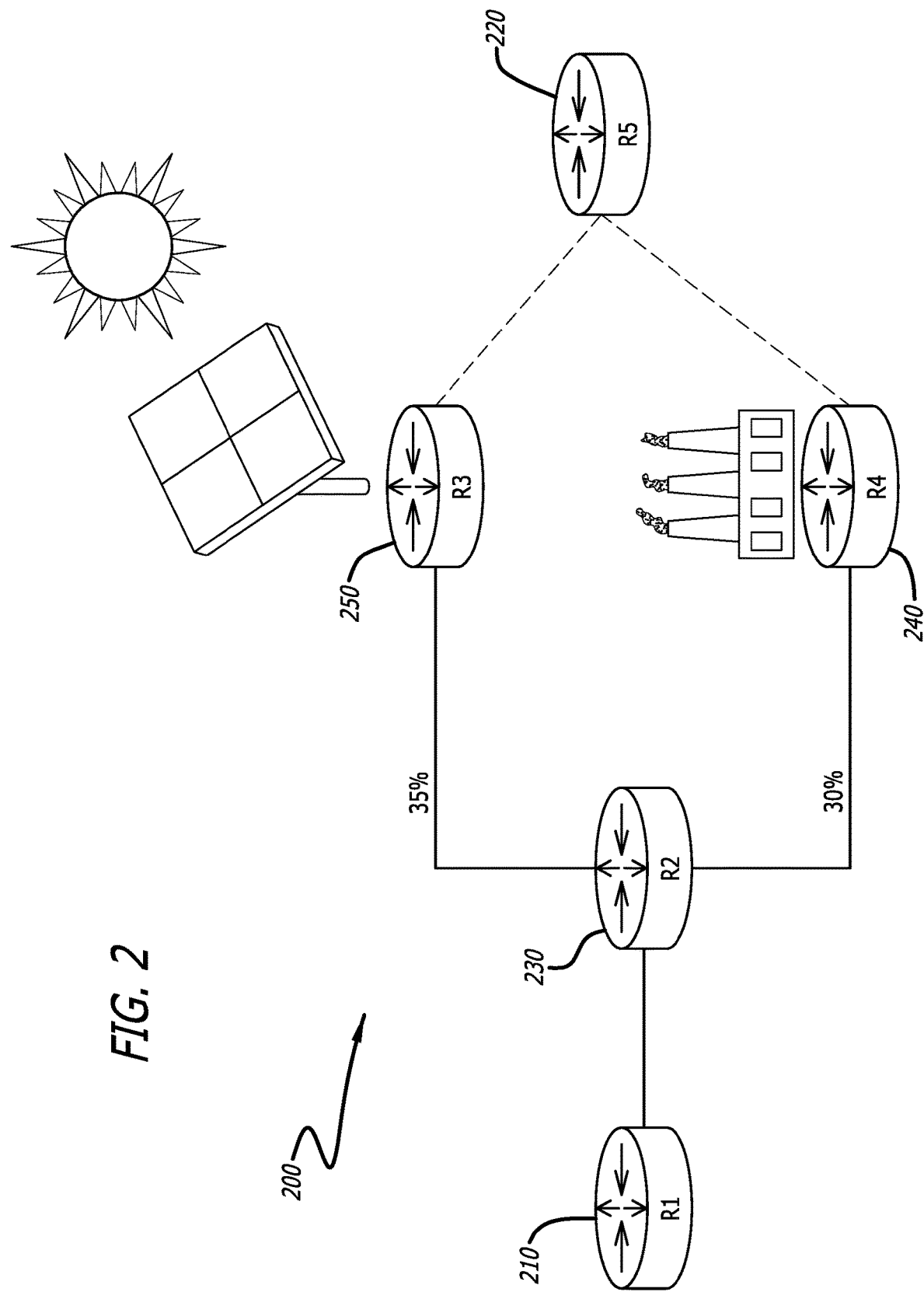
FIG. 2 is a simplified diagram of a network of devices suitable for virtual meetings powered by different power sources in accordance with various embodiments of the disclosure.

Referring to FIG. 2, a simplified diagram of a network of devices suitable for virtual meetings powered by various power source types in accordance with various embodiments of the disclosure is shown. The network 200 can include a plurality of devices, e.g., routers, which can be in communication with each other and/or a remote server, which may be connected to the network via a router 220 (R5). The network 200 depicted in FIG. 2 is shown as a simplified, conceptual network where a router 210 (R1) is connected to a router 230 (R2) which may route data to router 250 (R3) or router 240 (R4) onward to router 220 (R5). Those skilled in the art will understand that a network 200 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 200 have not considered various aspects of operation that can relate to the overall sustainability of the network. For example, devices in communication networks have often used grid-supplied energy as a primary power source. This grid-supplied energy can regularly provide energy that has been generated by a non-sustainable or negative environmental impacts-heavy power source such as a coal-powered power plant. However, modern power grids often have more diverse and cleaner energy sources for the provided generated energy. Some devices can still be powered by power sources that utilize fossil fuels, such as the router 240 (R4) as depicted in FIG. 2. Alternatively, some devices can operate by using renewable sources of energy, such as the router 250 (R3) which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability attributes.

In the embodiment depicted in FIG. 2, the operation of a non-sustainable coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to a subsequent event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability attributes of that network device. During operation, one or more devices within the network may seek and collect the sustainability attributes of various network devices, which can provide insight into both the type of power source providing power to the device, but also the various capabilities of the network device that may be activated to provide more efficient operation.

Additionally, when generating various scores, metrics, or other evaluations of the network devices within a network 200, the sustainability attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 200 is described above with respect to FIG. 2, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 2 may also be interchangeable with other elements of FIGS. 1 and 3-10 as required to realize a particularly desired embodiment.

Figure 3:
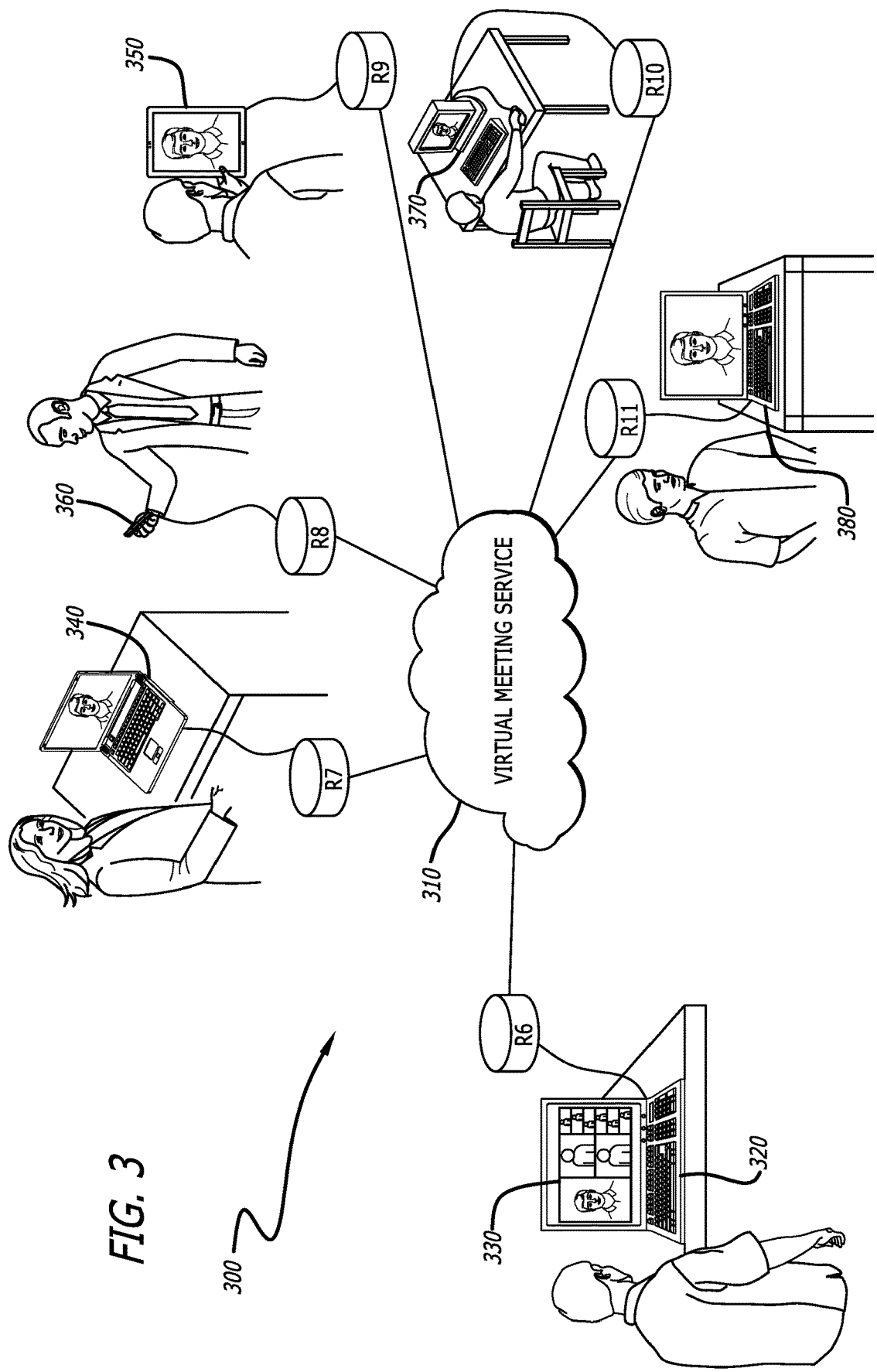
FIG. 3 is a conceptual schematic diagram of a one-to-many virtual meeting in accordance with various embodiments of the disclosure.

Referring to FIG. 3, a conceptual schematic diagram of a one-to-many virtual meeting 300 in accordance with various embodiments of the disclosure is shown. In some virtual meetings, it can be configured such that one (or a few) people are the main subjects of the meeting and that many other attendees will be primarily watching them. During these one-to-many meetings, there is a majority of dialogue from the presenter to the attendees.

In the embodiment depicted in FIG. 3, the presenter may utilize their personal computing device, such as a first laptop 320 to capture and generate a video transmission (conceptually shown as the subject captured in frame). The virtual meeting can be facilitated by a virtual meeting service 310 that can connect one or more attendees together. The presenter may connect to the virtual meeting service over a network through a plurality of network devices (conceptually shown as router r6). During the presentation of the virtual meeting, the video transmission 330 can be transmitted to the various attendees, such as to a second laptop 340 (through a plurality of network devices conceptually shown as router R7), a smartphone 360 (through a plurality of network devices conceptually shown as router R8), a tablet 350 (through a plurality of network devices conceptually shown as router R9), a desktop computer 370 (through a plurality of network devices conceptually shown as router R10), and a third laptop 380 (through a plurality of network devices conceptually shown as router R11).

During the virtual meeting, the video transmission 330 can be shown on each of the network-connected devices of the attendees. However, to reduce the amount of data and/or power that is required, one or more configurations or settings on the devices can be changed. Thus, the virtual meeting may be conducted in a more sustainable way.

Figure 4:
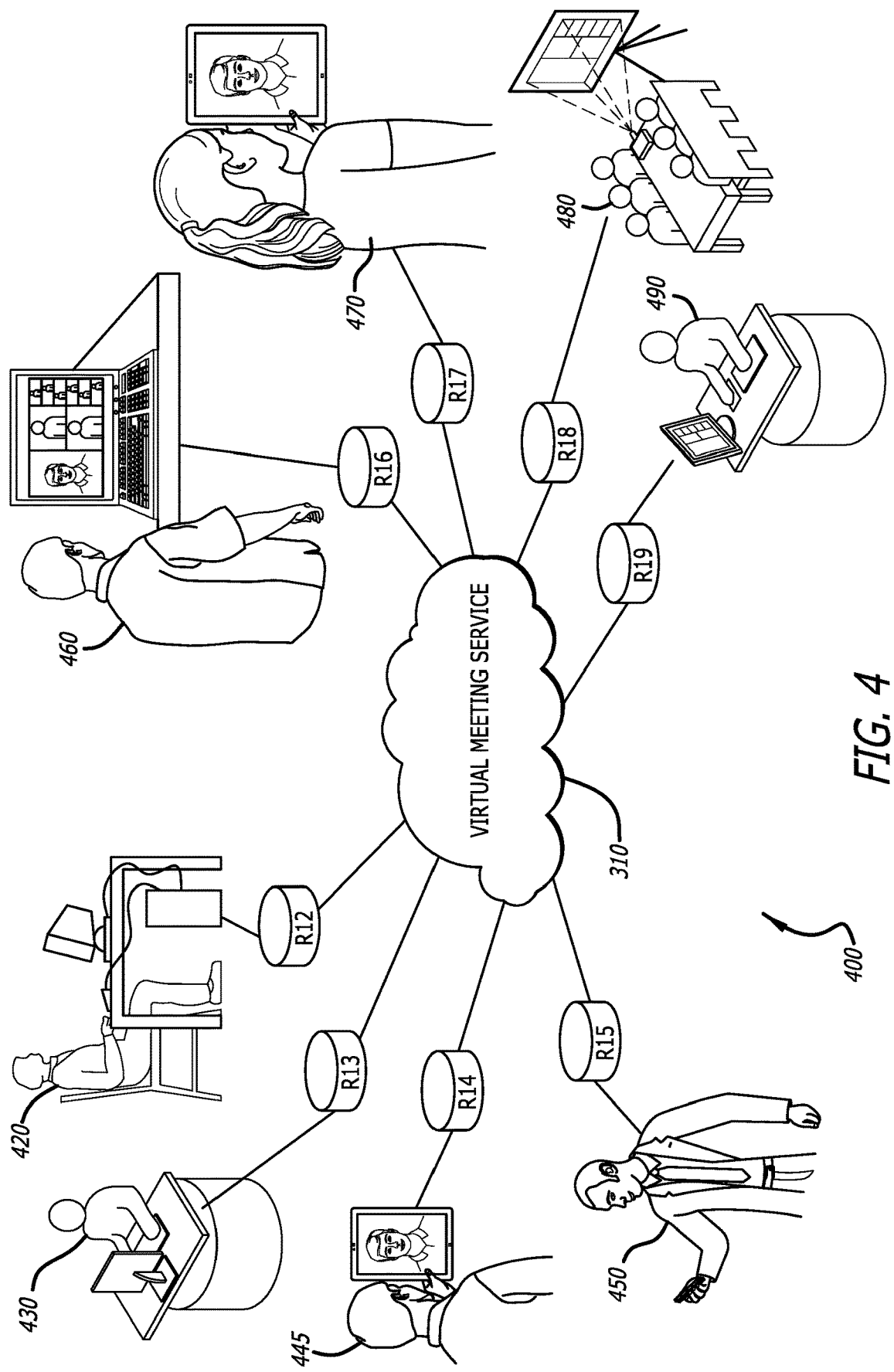
FIG. 4 is a conceptual schematic diagram of a many-to-many virtual meeting in accordance with various embodiments of the disclosure.

Referring to FIG. 4, a conceptual schematic diagram of a many-to-many virtual meeting 400 in accordance with various embodiments of the disclosure is shown. In some virtual meetings, it can be configured such that everyone can be the main subject of the meeting depending on who is speaking. During these many-to-many meetings, no attendee necessarily has a majority of dialogue during the meeting.

In the embodiment depicted in FIG. 4, the attendees 420-490 may utilize their available computing devices, such as, but not limited to, laptop computers, desktop computers, smartphones, tablets, and/or presentation devices to capture and generate a video transmission. This may require determining the quantity of video transmissions within the virtual meeting. These computing devices can each be connected to a virtual meeting service 310 through a plurality of network devices conceptually shown as routers R12-R19. The virtual meeting service 310 can connect one or more attendees together.

Similar to the virtual meeting depicted in FIG. 3, the video transmission can be shown on each of the network-connected devices of the attendees 420-490. However, to reduce the amount of data and/or power that is required to be transmitted by the virtual meeting service 310, one or more capabilities or features can be enabled and/or disabled. In some embodiments, a user may be prompted to change devices. For example, user 490 may be prompted to join an audio only virtual meeting via a phone which typically requires far less power to join the same meeting.

Although specific embodiments for virtual meetings are described above with respect to FIGS. 3-4, any of a variety of systems and/or processes may be utilized in accordance with embodiments of the disclosure. For example, the virtual meetings may be conducted in a peer-to-peer configuration wherein the processes carried out by the virtual meeting service 310 are instead conducted on one or more of the client applications within the computing devices of the attendees. The elements depicted in FIGS. 3-4 may also be interchangeable with other elements of FIGS. 1-2 and 5-10 as required to realize a particularly desired embodiment.

Figure 5:
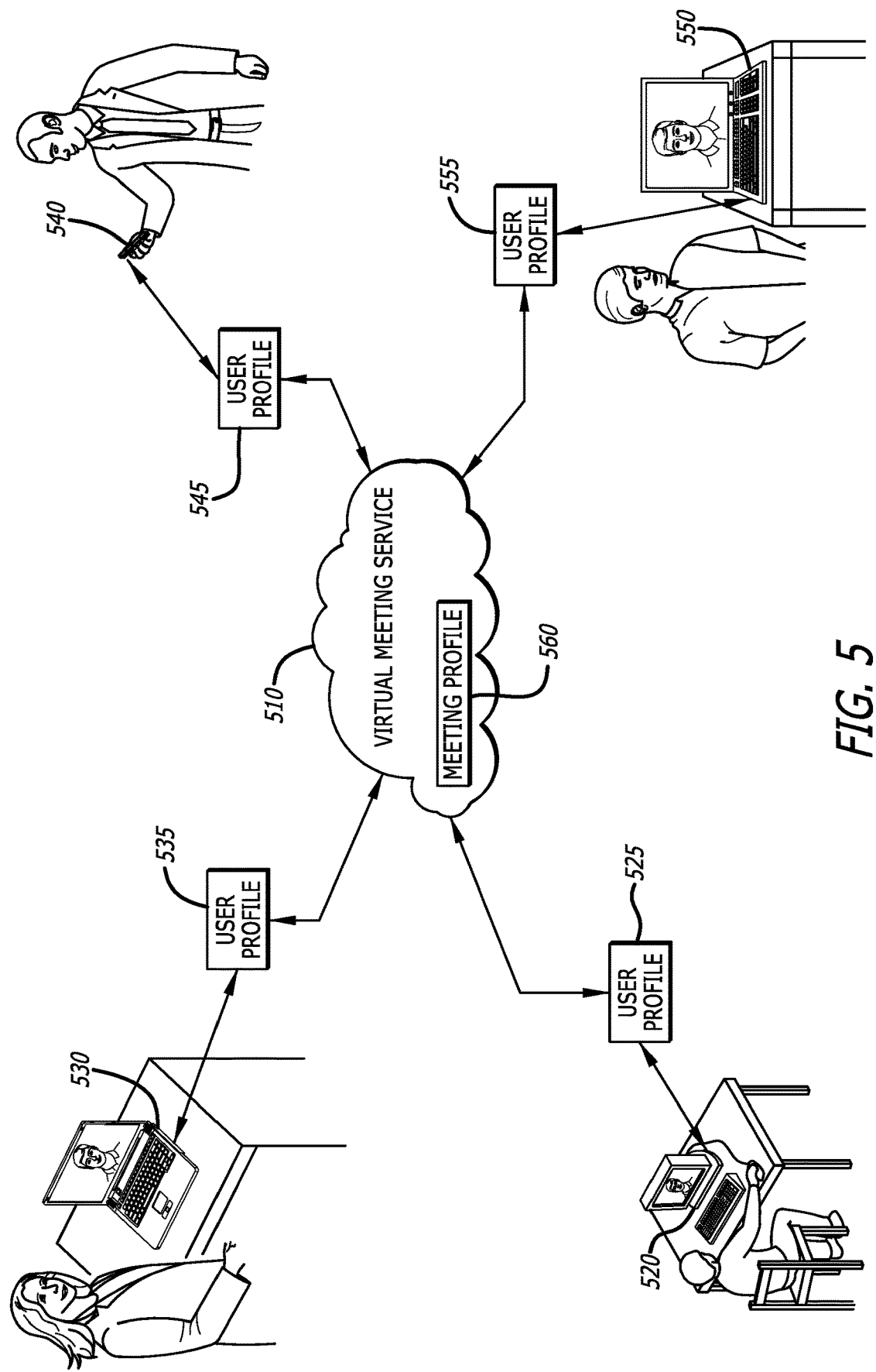
FIG. 5 is a conceptual illustration of utilizing user profile data to establish and conduct a virtual meeting in accordance with various embodiments of the disclosure.

Referring to FIG. 5, a conceptual illustration of utilizing user profile data to establish and conduct a virtual meeting in accordance with various embodiments of the disclosure is shown. In many embodiments, a number of participants can set up a virtual meeting through a virtual meeting service 510. The virtual meeting may be hosted by a participant on a first device 520. The first device 520 can be associated with a first user profile 525. The virtual meeting can be set up to include 3 additional participants wherein each participant is associated a specific device, namely a second device 530, a third device 540, and a fourth device 550. The second device 530 can be associated with a second user profile 535, while the third device 540 can be associated with a third user profile 545. Finally, the fourth user device 550 can be associated with a fourth user profile 555. Each user profile can be associated with the participant corresponding to each device.

In some embodiments, when the host sets up the virtual meeting, the virtual meeting service 510 can coordinate and request the user profiles for each participant. When the user profiles 525, 535, 545, 555 are received by the virtual meeting service 510, a meeting profile 560 can be generated that is specific to the virtual meeting being established. However, in certain embodiments, the meeting profile 560 can be generated by the virtual meeting client software operated on the first device 520. Subsequently, the meeting profile 560 can be transmitted to each user device 520, 530, 540, 550. This transmission may include one or more configuration suggestions which may prompt the users to enable or disable a feature on the device, or to switch to a different device, etc.

Although a specific embodiment for a conceptual illustration of utilizing user profile data to establish and conduct a virtual meeting is described above with respect to FIG. 5, any of a variety of systems and/or processes may be utilized in accordance with embodiments of the disclosure. For example, any number of participants can be added to a virtual meeting and the generation of meeting profile data and associated suggestions transmitted to the participants and their corresponding devices can continue throughout the virtual meeting. The elements depicted in FIG. 5 may also be interchangeable with other elements of FIGS. 1-4 and 6-10 as required to realize a particularly desired embodiment.

Figure 6:
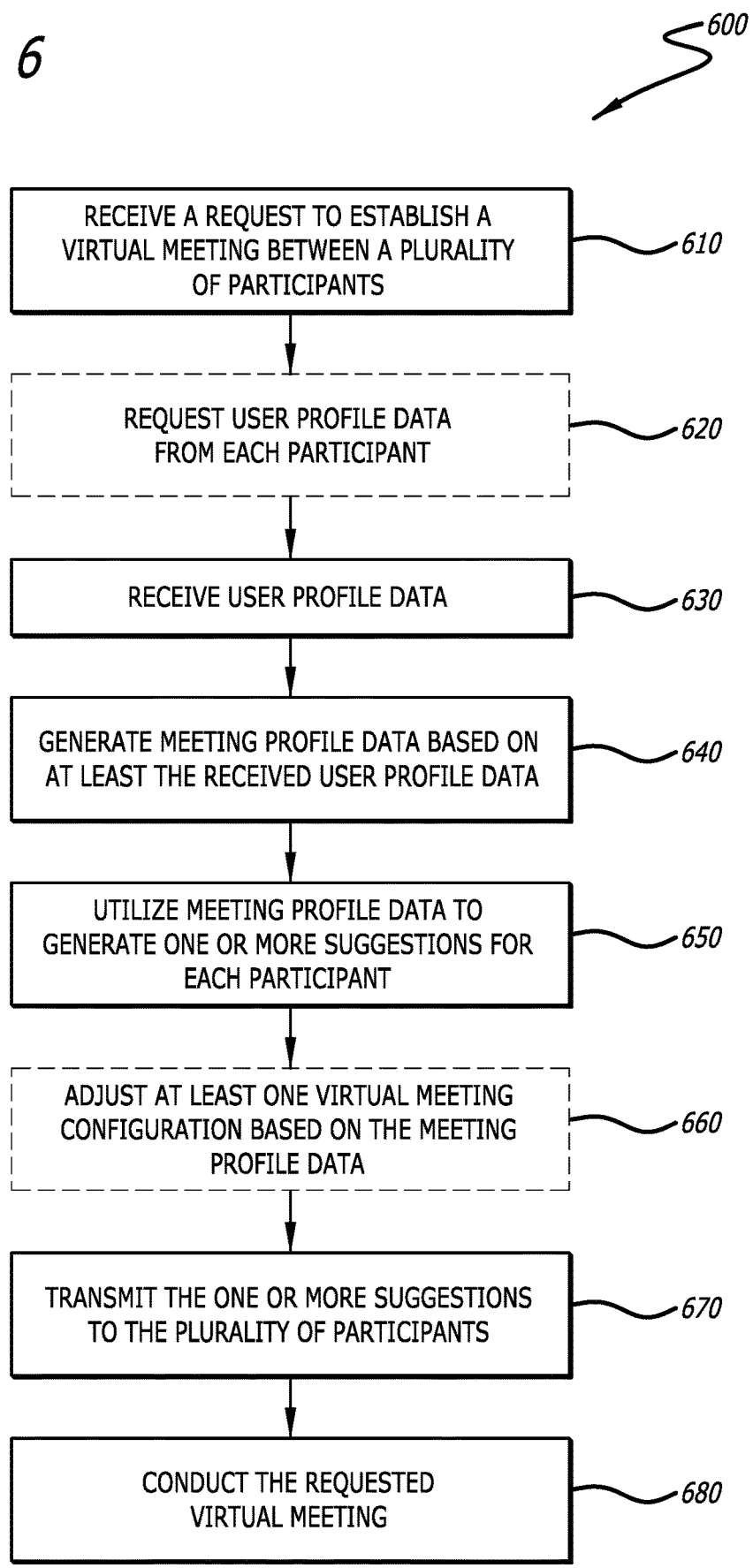
FIG. 6 is a flowchart depicting a process for conducting a virtual meeting utilizing user profile data in accordance with various embodiments of the disclosure.

Referring to FIG. 6, a flowchart depicting a process 600 for conducting a virtual meeting utilizing user profile data in accordance with various embodiments of the disclosure is shown. In many embodiments, the process 600 can receive a request to establish a virtual meeting between a plurality of participants (block 610). In some embodiments this request may be from the host of the virtual meeting. However, the request may also be received from the host requesting a virtual meeting to be conducted at a certain time and date in the future.

In some optional embodiments, the process 600 can request the user profile data from each participant of the virtual meeting (block 620). In these embodiments, the virtual meeting host or software that is acting on behalf of the virtual meeting host, can ping each participant and request user profile data. In certain embodiments, the virtual meeting software may already have defined user profiles and associated user profile data that can be shared with the hosts of the virtual meeting. However, in additional embodiments, the user profile data may be provided by the participants of the virtual meeting without the need for a specific request for the user profile data.

In further embodiments, the process 600 can receive user profile data (block 630). As discussed above, user profile data can include data associated with a user and their corresponding device(s) that may be utilized during the virtual meeting. Other user data may be included such as location, power source type, and available configurations available within the devices.

In more embodiments, the process 600 can generate meeting profile data based on at least the received user profile data (block 640). While the user profile data is typically associated with each participant of the virtual meeting, the meeting profile data can be associated with the virtual meeting itself and can be different for each virtual meeting. In certain embodiments, the meeting profile data can be utilized to generate one or more suggestions for each participant (block 650). These suggestions may include, for example, which device the participant should use, whether the participant should join with video, what video quality should be received, etc. However, other configurations are contemplated.

In some optional embodiments, the process 600 can adjust at least one virtual meeting configuration based on the meeting profile data (block 660). These embodiments may determine that a global change to the virtual meeting may be desired to increase the overall sustainability of the virtual meeting. This could include changing global video settings changes, audio quality, recording location, etc. Other types of configuration changes are contemplated as needed to facilitate a sustainable virtual meeting.

In a number of embodiments, the process 600 can transmit the one or more suggestions to the plurality of participants (block 670). These suggestions can be transmitted prior to the start of the virtual meeting or may be sent as the virtual meeting is commencing and being set up and when participants are connecting. Eventually, the process 600 can conduct the requested virtual meeting (block 680).

Although a specific process for virtual meetings is described above with respect to FIG. 6, any of a variety of systems and/or processes may be utilized in accordance with embodiments of the disclosure. For example, the process 600 may be carried out within a centralized virtual meeting service or may be carried out on a virtual meeting client software, such as the software associated with the virtual meeting host. The elements depicted in FIG. 6 may also be interchangeable with other elements of FIGS. 1-5 and 7-10 as required to realize a particularly desired embodiment.

Figure 7:
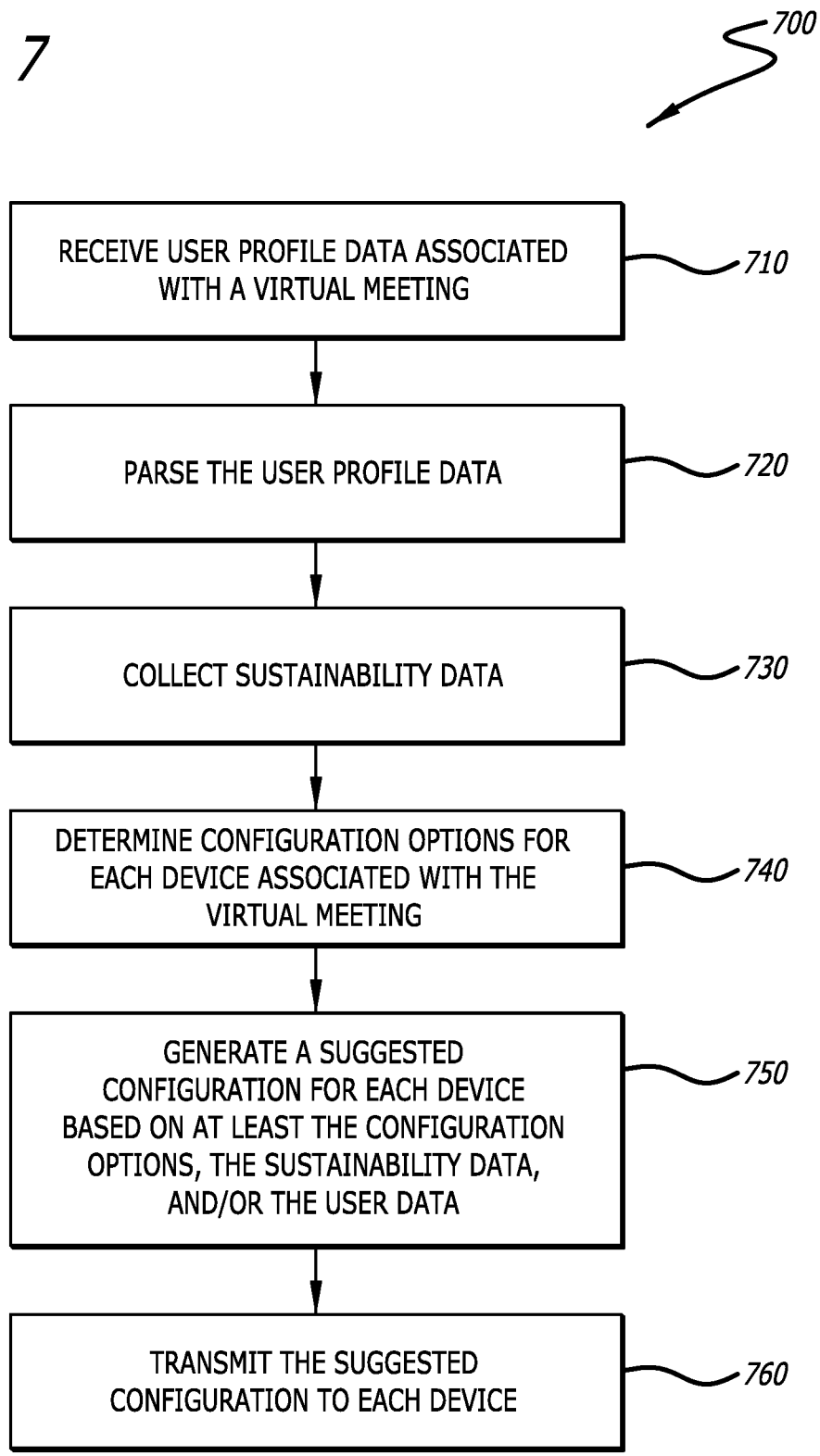
FIG. 7 is a flowchart depicting a process for generating suggested configurations for virtual meetings in accordance with various embodiments of the disclosure.

Referring to FIG. 7, a flowchart depicting a process 700 for generating suggested configurations for virtual meetings in accordance with various embodiments of the disclosure is shown. In many embodiments, the process 700 can receive user profile data associated with a virtual meeting (block 710). In some embodiments, this may be received at a virtual meeting service, such as a remote cloud-based service. However, additional embodiments may receive the user profile data at a client-side virtual meeting software.

In more embodiments, the process 700 can parse the user profile data (block 720). As described above, the user profile data may comprise a number of different types of data. Only certain pieces of that data may be relevant to the current process 700 so parsing can allow for extracting that relevant data.

In further embodiments, the process 700 can collect sustainability data (block 730). As discussed in more detail above, sustainability data can comprise a number of different data points related to negative environmental effects. The sustainability data can be extracted in certain cases, from the user profile data. In more embodiments, the sustainability data can be accessed from one or more third-party services. These services can indicate what power source types are associated with the location of the participants of the virtual meeting, etc.

In a number of embodiments, the process 700 can determine configuration options for each device associated with the virtual meeting (block 740). As described above, each participant can have a corresponding device that can be utilized to conduct the virtual meeting (laptop, desktop, smart phone, etc.). Each of these devices can have one or more sustainability-related configurations that can be enabled and/or disabled. The mix of these different configurations for each of the corresponding devices can allow for a specific mix of configurations to maximize the overall virtual. meeting sustainability. As a result, various embodiments of the process 700 can generate a suggested configuration for each device based on at least the configuration options, the sustainability data, and/or the user data (block 750). However, in some embodiments, the suggested configuration may be based on a partial mix of these data sources.

In still more embodiments, the process 700 can transmit the suggested configuration to each device (block 760). This transmission can be done at the inception of the virtual meeting when participants are agreeing to certain available time slots. However, the transmission may also be done when the participants are connecting to the virtual meeting. In further additional embodiments, the process can verify that the suggested configurations have been adopted by each device that is associated with the virtual meeting. This verification can be done by polling the devices or by receiving some sort of signal indicating that the suggested configuration was adopted.

Although a specific process for generating suggested configurations is described above with respect to FIG. 7, any of a variety of systems and/or processes may be utilized in accordance with embodiments of the disclosure. For example, the process 700 may be carried out within a centralized virtual meeting service or may be carried out on a virtual meeting client software, such as the software associated with the virtual meeting host. The elements depicted in FIG. 7 may also be interchangeable with other elements of FIGS. 1-6 and 8-10 as required to realize a particularly desired embodiment.

Figure 8:
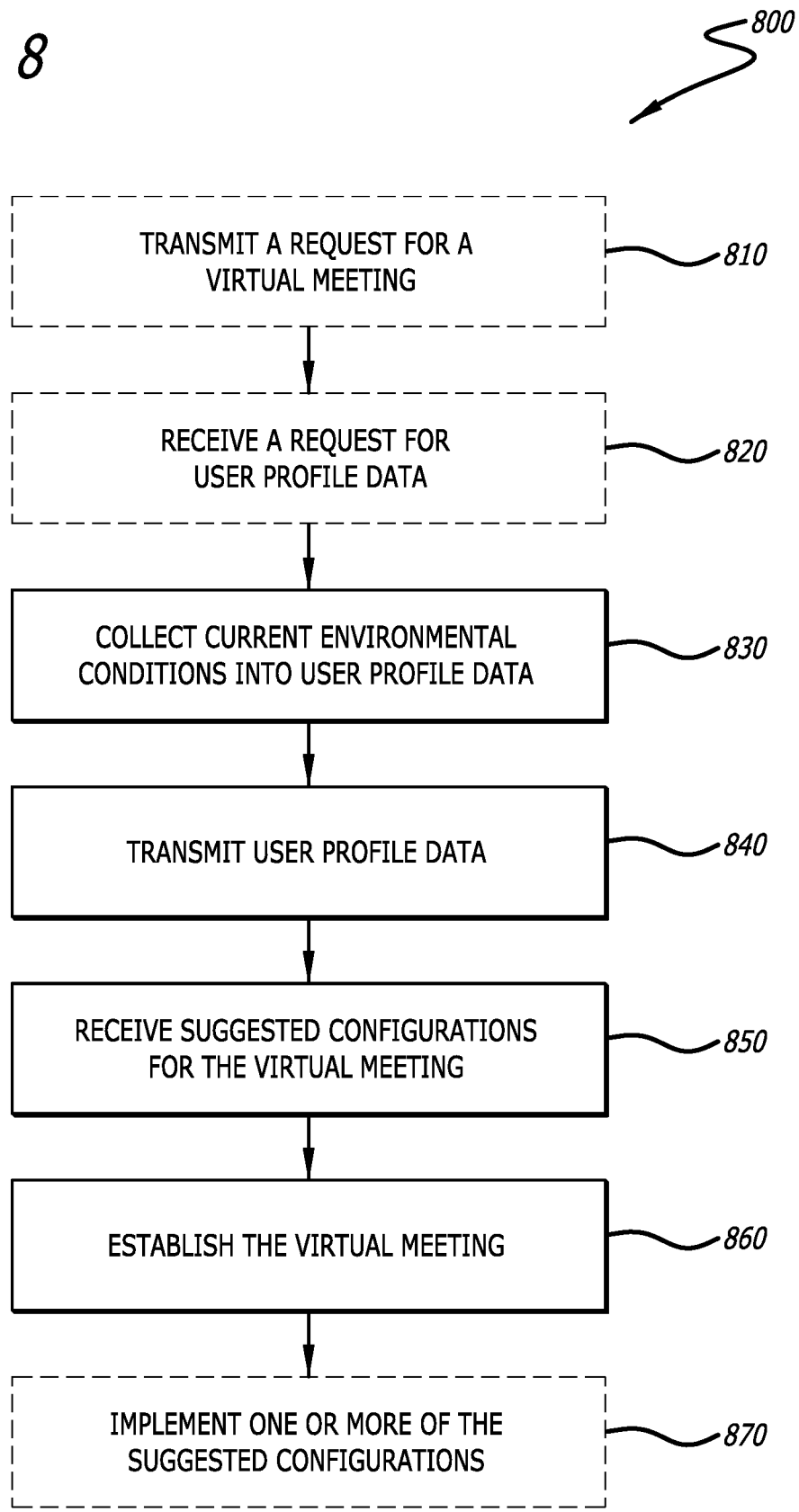
FIG. 8 is a flowchart depicting a process for conducting a virtual meeting on a client device in accordance with various embodiments of the disclosure.

Referring to FIG. 8, a flowchart depicting a process 800 for conducting a virtual meeting on a client device in accordance with various embodiments of the disclosure is shown. In certain optional embodiments, the process 800 can transmit a request for a virtual meeting (block 810). In these embodiments, the client software can receive input from a user that they wish to set up a virtual meeting. Thus, the request to set up that virtual meeting can be sent to the virtual meeting service, or other participants in the virtual meeting.

In additional optional embodiments, the process 800 can receive a request for user profile data (block 820). In these embodiments, the virtual meeting service may reach out to each participant to gather user profile data. Thus, the request can be received by each participant client device. However, in some embodiments, the client software may automatically process user profile data without the need for a request.

In many embodiments, the process 800 can collect current environmental conditions into user profile data (block 830). Often, the user profile data includes data related to the current environment of the participant, which can include which device the participant is using, and what the power source type is for that device, etc. In some embodiments, the user profile data is already present within the device and collecting local condition data is not required.

In further embodiments, the process 800 can transmit the user profile data (block 840). In certain embodiments, the transmission is to the virtual meeting service, but the transmission may also be made to the host of the virtual meeting if their software is coordinating the meeting. Subsequently, the process 800 can receive suggested configurations for the virtual meeting (block 850). The configurations can be directed to one or more sustainability-related configurations associated with the corresponding device of the user. In some embodiments, the configurations can be related to one or more settings within the virtual meeting itself, such as audio and/or video quality, etc.

In a number of embodiments, the process 800 can establish the virtual meeting 860. As those skilled in the art will recognize, establishing a virtual meeting can include connecting to the virtual meeting at the scheduled time of the meeting. In more optional embodiments, the process 800 can implement one or more of the suggested configurations (block 870). While not required in many embodiments, there may be instances where the participant gives the virtual meeting service or host the ability to dynamically and automatically adjust one or more configurations related during the virtual meeting, during the virtual meeting if it will help retain a predefined level of sustainability.

Although a specific process for conducting a virtual meeting on a client device is described above with respect to FIG. 8, any of a variety of systems and/or processes may be utilized in accordance with embodiments of the disclosure. For example, the process 800 may be carried out within a centralized virtual meeting service or may be carried out on a virtual meeting client software, such as the software associated with the virtual meeting host. The elements depicted in FIG. 8 may also be interchangeable with other elements of FIGS. 1-7 and 9-10 as required to realize a particularly desired embodiment.

Figure 9:
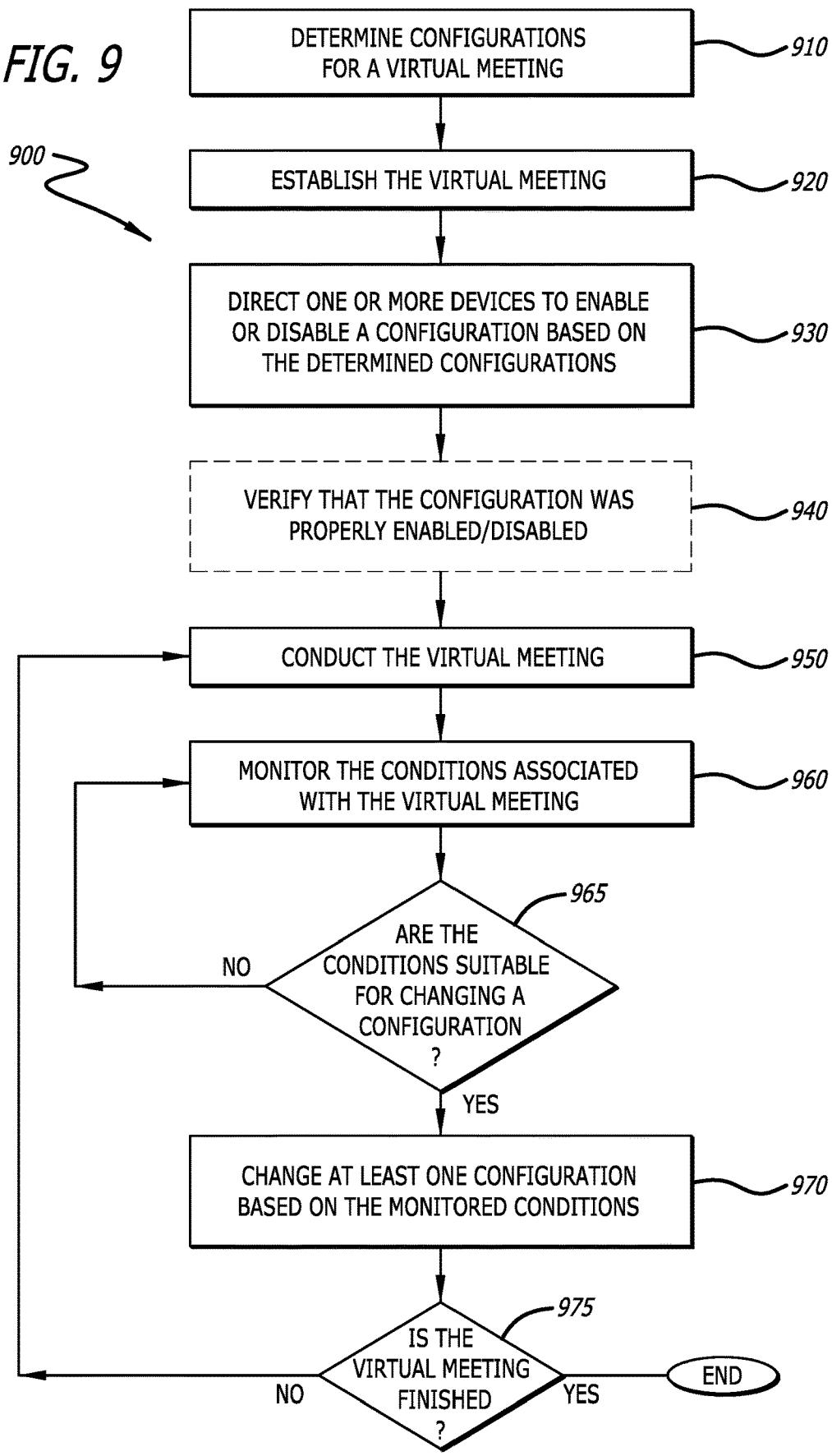
FIG. 9 is a flowchart depicting a process for changing configurations of virtual meeting devices during a virtual meeting in accordance with various embodiments of the disclosure.

Referring to FIG. 9, a flowchart depicting a process 900 for changing configurations of virtual meeting devices during a virtual meeting in accordance with various embodiments of the disclosure is shown. Often, it may be necessary to monitor and adjust configurations of a virtual meeting after the virtual meeting has commenced. In many embodiments, the process 900 can determine configurations for a virtual meeting (block 910). This determination can be done via a virtual meeting service in a centralized fashion or may be determined on client-based software on a per-user basis.

In more embodiments, the process 900 can establish the virtual meeting (block 920). As those skilled in the art will recognize, establishing the virtual meeting can be done when participants all connect to the virtual meeting at the agreed upon start time. Subsequently, the process 900 can direct one or more devices to enable or disable a configuration based on the determined configurations (block 930). As discussed above, the configurations can be associated with one or more sustainability related (i.e., energy-savings) features that may be unique to each type of device that is associated with the virtual meeting. Thus, at least some configuration on at least one device within the meeting may be directed by the process 900 to increase the overall sustainability of the virtual meeting.

In some optional embodiments, the process 900 can verify that the configuration was properly enabled/disabled (block 940). In these embodiments, a subsequent signal may be read or received that can indicate that the configuration was properly enabled and/or disabled as directed. However, in some embodiments, the direction to enable or disable a configuration can be sent out by the process 900 but may not be verified directly. In some more embodiments, the verification may not be done by receiving an acknowledgement signal directly form the affected device but can be inferred from tracking on or more related signals or data sources (e.g., seeing that a reduced video rate is being received from the client, etc.).

In a number of embodiments, the process 900 can conduct the virtual meeting (block 950). This can simply mean carrying out the virtual meeting during the times designated between the participants. During the virtual meeting, various embodiments of the process 900 can monitor the conditions associated with the virtual meeting (block 960). As those skilled in the art will recognize, various conditions can change as the virtual meeting occurs. By way of non-limiting example, a screen share may be presented that is very static in nature, requiring less data to be transferred across the network, while other meetings may have a lot of discussions between a lot of participants such that a large amount of audio and video data is required to be transferred.

Because of this, in various embodiments, the process 900 can determine if the conditions are suitable for a changing of one or more configurations (block 965). If it is determined that no changes are necessary, then the process 900 can continue to monitor the virtual meeting conditions (block 960). However, when the process 900 does determine that conditions are suitable for a change, the process 900 can in some embodiments, change at least one configuration based on the monitored conditions (block 970). As discussed above, the configurations can include various settings including, but not limited to, changing the overall frame rate, changing the video and/or audio quality, and turning on or off a configuration specific to a device corresponding to a participant of the virtual meeting.

In still further embodiments, the process 900 can determine if the virtual meeting has ended (block 975). If the virtual meeting has ended, the process 900 can end. However, if the virtual meeting is still occurring, the process 900 can continue to conduct the virtual meeting (block 950). Thus, there may be embodiments wherein multiple configurations are adjusted based on multiple changing conditions. In fact, it is contemplated that any number of changing conditions may trigger a variety of configuration changes. Indeed, many configurations can be done in order to keep a virtual meeting within a predetermined sustainability threshold, which may be set by the virtual meeting host, or automatically by the virtual meeting service.

Although a specific process for changing configurations of virtual meeting devices during a virtual meeting is described above with respect to FIG. 9, any of a variety of systems and/or processes may be utilized in accordance with embodiments of the disclosure. For example, the process 900 may attempt to keep the overall virtual meeting under a certain sustainability threshold that can be computed either on a per-device basis or as an aggregate basis. The elements depicted in FIG. 9 may also be interchangeable with other elements of FIGS. 1-8 and 10 as required to realize a particularly desired embodiment.

Figure 10:
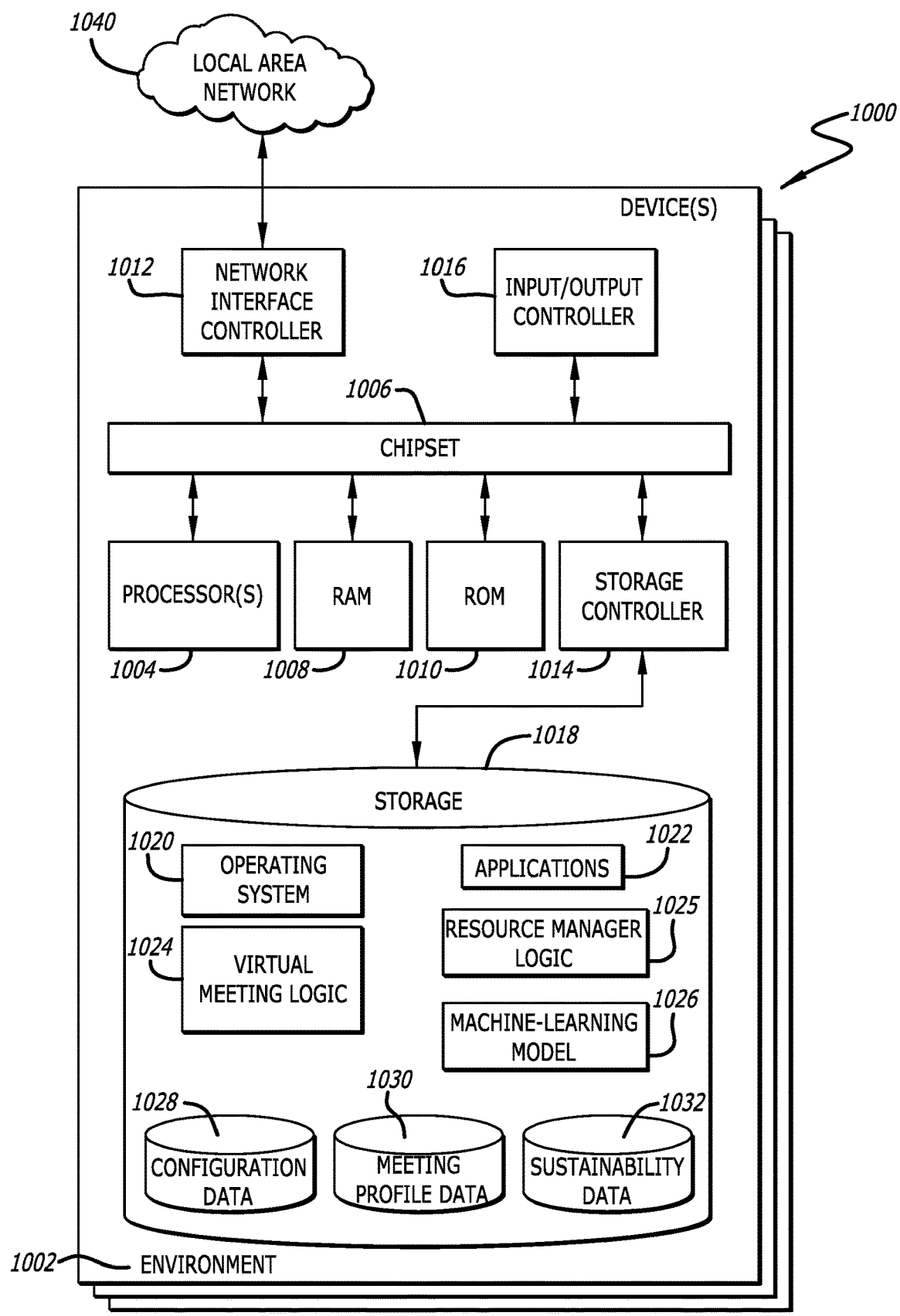
FIG. 10 is a conceptual block diagram of a device suitable for use in a sustainability-aware virtual meeting system in accordance with various embodiments of the disclosure.

Referring to FIG. 10, a conceptual block diagram of a device suitable for use in a sustainability-aware virtual meeting system in accordance with various embodiments of the disclosure is shown.

Referring to FIG. 10, a conceptual block diagram of a device suitable for use in a sustainability-aware virtual meeting system in accordance with various embodiments of the disclosure is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the applications and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processor(s) 1004, such as, but not limited to, central processing units (CPUs), controllers, etc. that can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory (RAM 1008), which can be used as the main memory in the device 1000 in some embodiments. In a number of embodiments, the memory can be communicatively coupled to the processor(s) 1004 to carry out one or more instructions. The chipset 1006 can further be configured to provide an interface to a computer-readable storage medium such as a read-only memory (ROM 1010) or non-volatile RAM (NVRAM) for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface controller 1012, which may provide access to external devices through, for example, a plurality of communication ports such as, but not limited to, a network interface card (NIC). A NIC may comprise a gigabit Ethernet adapter or similar component. The plurality of communication ports can be capable of connecting or otherwise coupling the device 1000 to other devices over the network 1040. It is contemplated that multiple communication ports, such as NICs may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, and data, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by a device 1000 or a plurality of devices operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-10. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a virtual meeting logic 1024, that can be configured to perform one or more of the various steps, processes, operations, and/or other methods that are described above. Often, the virtual meeting logic 1024 can be a set of instructions stored within a non-volatile memory that, when executed by the processor(s) 1004 can carry out these steps, etc. In some embodiments, the virtual meeting logic 1024 may be a client application that resides on a network-connected device, such as, but not limited to, a personal or mobile computing device. In these embodiments, the virtual meeting logic 1024 can facilitate the establishment and conduct one or more virtual meetings within the device, such as those devices depicted in FIGS. 1 and 3-5. In certain embodiments, the virtual meeting logic 1024 may be configured to receive and process configuration suggestions that can direct one or more configurations, such as energy-saving settings to be either enabled or disabled.

In a number of embodiments, the storage 1018 can include meeting configuration data 1028. As described above, configuration data 1028 can be utilized to optimize the sustainability of a virtual meeting. In some embodiments, the configuration data 1028 can indicate the type of virtual meeting that will be conducted, as well as the types of devices that are likely to attend. The configuration data 1028 may also include, in certain embodiments, the network paths, devices, or types of connections that may be utilized during a virtual meeting. In still more embodiments, the configuration data 1028 can include various energy-saving or other features that can be enabled and/or disabled.

In various embodiments, the storage 1018 can include user profile data 1029. As described above, each participant within a virtual meeting may be user profile data 1029 that can be associated with that participant. In certain embodiments, the user profile data 1029 can be comprised of data that can indicate what device the participant may use, as well as what configurations are available or otherwise associated with the corresponding device that the participant may use. The user profile data 1029 may also indicate where the participant may join the virtual meeting from, which can allow for the determination of the type of power supplying the device the participant is using.

In still more embodiments, the storage 1018 may include meeting profile data 1030. Also described above, meeting profile data 1030 can be generated upon receiving the user profile data 1029 from each of the participants. However, in some embodiments, that may not be necessary and the meeting profile data 1030 can be generated from a partial selection of user profile data 1029. The meeting profile data 1030 may include data related to the overall configurations available for the devices associated with the user profile data 1029 received. Indeed, in various embodiments, the meeting profile data 1030 can allow for the determination of an optimal configuration of settings throughout the virtual meeting in order to maximize the overall sustainability of the virtual meeting.

In still more embodiments, the storage 1018 can include sustainability data 1032. As described above in the discussion of FIG. 2, sustainability data can include sustainability attributes of various devices, elements, and other components of a virtual meeting network. The sustainability data 1032 may comprise both capability data related to various devices but can also include the power source type associated with each device within a network proposed or being utilized by a virtual meeting. In some embodiments, the sustainability data 1032 can include historical data such that decisions or inferences can be generated without all current real-time data, or to make a prediction of upcoming network conditions.

Finally, in many embodiments, data may be processed into a format usable by one or more machine-learning (ML) model(s) 1026 (e.g., feature vectors), and or other preprocessing techniques. The ML model(s) 1026 may be any type of ML model, such as any of various supervised models, reinforcement models, and/or unsupervised models. The ML model(s) 1026 may include one or more of linear regression models, logistic regression models, decision trees, Naïve Bayes models, neural networks, k-means cluster models, random forest models, and/or other types of ML model(s) 1026.

The ML model(s) 1026 can be configured to generate inferences to make predictions or draw conclusions from data. An inference can be considered the output of a process of applying a model to new data. This can occur by learning from historical data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc.

The ML model(s) 1026 may be configured to predict the usage and/or configurations of a better sustainability-optimized virtual meeting. Likewise, the ML model(s) 1026 may be configured in certain embodiments to process various data to make a determination on whether a configuration may need to be changed. In some embodiments, the ML model(s) 1026 may be utilized to determine which specific configuration needs to be adjusted.

Although a specific embodiment for a device suitable for carrying out the various steps, processes, methods, and operations described above is discussed with respect to FIG. 10, any of a variety of systems and/or processes may be utilized in accordance with embodiments of the disclosure. For example, the device may be virtualized or disposed as a logic and data stores within a mobile or personal general computing device, allowing for the transformation of the device, upon execution by a processor/controller, to a sustainability-aware virtual meeting device. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor;
a communication port coupled with a second device; and
a virtual meeting logic configured to:
   establish a virtual meeting with a plurality of participants;
   receive user profile data associated with at least the current sustainability-related environmental conditions of the plurality of participants;
   generate one or more suggestions for each of the plurality of participants, wherein at least one of the one or more suggestions relates to adjusting at least one of an audio or video quality setting on a corresponding device associated with one of the plurality of participants;
   transmit the one or more suggestions to the plurality of participants; and
   conduct the virtual meeting.

2. The device of claim 1, wherein the virtual meeting logic is further configured to generate meeting profile data based on at least the received user profile data.

3. The device of claim 2, wherein the generation of the one or more suggestions is based on the meeting profile data.

4. The device of claim 2, wherein the virtual meeting logic is further configured to adjust at least one virtual meeting configuration based on the meeting profile data.

5. The device of claim 1, wherein the virtual meeting logic is further configured to request user profile data from each participant prior to receiving user profile data.

6. The device of claim 1, wherein each of the plurality of participants has a corresponding device associated with the virtual meeting.

7. The device of claim 6, wherein the virtual meeting logic is further configured to collect sustainability data.

8. The device of claim 7, wherein the virtual meeting logic is further configured to determine one or more configuration options for each of the corresponding devices associated with the virtual meeting.

9. The device of claim 8, wherein the virtual meeting logic is further configured to generate a suggested configuration for each of the corresponding devices associated with the virtual meeting wherein the suggested configuration is based on the collected sustainability data and determined one or more configuration options.

10. The device of claim 9, wherein the suggested configurations are transmitted to each of the corresponding devices associated with the virtual meeting.

11. The device of claim 10, wherein the virtual meeting logic is further configured to verify that the suggested configurations have been adopted by the corresponding devices associated with the virtual meeting.

12. The device of claim 11, wherein the virtual meeting logic is further configured to monitor one or more conditions associated with the virtual meeting.

13. The device of claim 12, wherein the virtual meeting logic if further configured to determine of the one or more conditions are suitable for a change in configuration.

14. The device of claim 13, wherein the virtual meeting logic is further configured to change at least one configuration during the virtual meeting based on the one or more conditions being suitable for a change in configuration.

15. A device, comprising:
a processor;
a memory communicatively coupled to the processor;
a communication port coupled with a second device; and
a virtual meeting logic configured to:
receive a request for user profile data;
collect current environmental conditions;
generate user profile data based on the collected sustainability-related environmental conditions;
transmit the user profile data; and
conduct the virtual meeting and receive one or more suggested configurations for the virtual meeting, wherein at least one of the one or more suggested configurations directs the device to adjust an audio or video quality setting.

16. The device of claim 15, wherein the virtual meeting logic is further configured to receive one or more suggested configurations associated with the virtual meeting.

17. The device of claim 16, wherein one or more of the suggested configurations are implemented during the virtual meeting.

18. A method of conducting a virtual meeting, comprising:
establishing a virtual meeting with a plurality of participants;
receiving user profile data associated with at least one or more sustainability-related environmental conditions;
generating one or more suggestions for each of the plurality of participants, wherein at least one of the one or more suggestions relates to adjusting at least one of an audio or video quality setting on a corresponding device associated with one of the plurality of participants;
transmitting the one or more suggestions to the plurality of participants; and
conducting the virtual meeting.

19. The method of claim 18, wherein the method further comprises:
requesting user profile data prior to receiving the user profile data; and
generating meeting profile data based on at least the received user profile data.

20. The method of claim 19, wherein the method further comprises utilizing the meeting profile data to generate one or more virtual meeting configuration suggestions for each of the plurality of participants and their associated devices.

* * * * *